United States Patent [19]
Lambert et al.

[11] Patent Number: 6,093,754
[45] Date of Patent: Jul. 25, 2000

[54] PROCESS FOR THE PREPARATION OF ARTICLES WITH A THREE-DIMENSIONAL SURFACE STRUCTURE, AND ARTICLES PREPARED BY THIS PROCESS

[75] Inventors: Siegfried Lambert, Münster; Karlheinz Dickerhof, Drensteinfurt; Wolfgang Kranig, Senden, all of Germany

[73] Assignee: BASF Coatings AG, Muenster-Hiltrup, Germany

[21] Appl. No.: 09/113,389

[22] Filed: Jul. 10, 1998

Related U.S. Application Data

[62] Division of application No. 08/727,384, Oct. 15, 1996, Pat. No. 5,830,573.

[30] Foreign Application Priority Data

Apr. 16, 1994 [DE] Germany ............................. 44 13 242

[51] Int. Cl.$^7$ ................. C08F 2/46; C08K 3/28
[52] U.S. Cl. ............. 522/182; 522/100; 522/104; 522/85; 522/84; 522/86; 522/183; 522/106
[58] Field of Search ................... 522/100, 104, 522/85, 84, 86, 182, 183, 106, 153

[56] References Cited

U.S. PATENT DOCUMENTS

| | | | |
|---|---|---|---|
| 3,924,023 | 12/1975 | Boranian et al. | 427/54 |
| 4,016,306 | 4/1977 | Miyagawa et al. | 427/54 |
| 4,070,262 | 1/1978 | Guarino et al. | 204/159.24 |
| 4,125,503 | 11/1978 | McCarty et al. | 260/29.7 |
| 4,146,452 | 3/1979 | Weber et al. | 204/159.14 |
| 4,287,039 | 9/1981 | Buethe et al. | 204/159.19 |
| 4,421,782 | 12/1983 | Bolgiano et al. | 427/53.1 |
| 4,789,604 | 12/1988 | van der Hoeven | 428/503 |
| 5,096,938 | 3/1992 | Beck et al. | 522/100 |
| 5,271,988 | 12/1993 | Ikemoto et al. | 204/159.14 |
| 5,548,005 | 8/1996 | Kurth et al. | 523/414 |

FOREIGN PATENT DOCUMENTS

| | | |
|---|---|---|
| 0 216 269 A2 | 9/1986 | European Pat. Off. . |
| 0 562 860 A1 | 3/1993 | European Pat. Off. . |
| 42 28 401 A1 | 8/1992 | Germany . |
| 2 229 965 | 10/1990 | United Kingdom . |

*Primary Examiner*—James J. Seidleck
*Assistant Examiner*—Sanza L. McClendon

[57] ABSTRACT

The invention relates to a process for the preparation of articles with a three-dimensional surface structure, in which a substrate is printed, at least one of the printing inks employed for the printing being varnish-repellent, and the printed substrate is then varnished. In accordance with the invention, the printed substrate is varnished with a radiation-curable varnish which contains no amino resin and comprises A) from 18 to 99.9% by weight of an epoxy acrylate, a polyether acrylate or a polyester acrylate, B) from 0.1 to 5.0% by weight of a Brönsted acid or an acid anhydride, C) from 0 [sic] to 12% by weight of a photoinitiator, D) from 0 to 40% by weight of water or at least one organic solvent, E) from 0 [sic] to 10% by weight of a polyol which may be ethoxylated and/or propoxylated and has from 2 to 50 carbon atoms in the molecule, and F) from 0 [sic] to 30% by weight of other auxiliaries and additives, and the varnish coat applied is cured with high-energy radiation.

4 Claims, No Drawings

PROCESS FOR THE PREPARATION OF ARTICLES WITH A THREE-DIMENSIONAL SURFACE STRUCTURE, AND ARTICLES PREPARED BY THIS PROCESS

This application is a divisional of Ser. No. 08/727,384, filed on Oct. 15, 1996, now U.S. Pat. No. 5,830,573, which is hereby incorporated by reference.

The invention relates to a process for the preparation of articles with a three-dimensional surface structure, in which a substrate is printed, at least one of the printing inks employed for the printing being varnish-repellent, and the printed substrate is then varnished, and to articles prepared by this process.

Processes of the type described above are known (cf. for example DE-A-32 47 677, EP-B-123 252 and EP-A-43 062) and are employed, in particular, for the preparation of so-called synthetic veneers. For this purpose, plain or impregnated paper sheets are printed with a wood pattern, the printing inks used being selected such that, at the points where pores imitated from natural wood are to be formed, varnish-repellent printing inks (so-called pore printing inks) are applied by printing. The layer of varnish applied subsequently then has a visible and tactile three-dimensional surface structure which can be distinguished from a natural wood surface only with difficulty.

For varnishing the printed paper sheets, the known processes employ aqueous, heat-curable varnishes whose binders comprise hydroxyl-containing resins in combination with amino resins. Disadvantages of varnishes of this kind are that they have to be stored as two-pack systems, give off formaldehyde and other elimination products, for example methanol, while being baked, and require varnishing equipment for which a good deal of space is required.

The technical object of the present invention was to provide a process for the preparation of articles with a three-dimensional surface structure, in which a substrate is printed, at least one of the printing inks (the so-called pore printing ink) employed for the printing being varnish-repellent, and the printed substrate is then coated, in which process the above-described disadvantages of the prior art occur either not at all or only to a reduced extent.

This object is surprisingly achieved by a process for the preparation of articles with a three-dimensional surface structure, in which a substrate is printed, at least one of the printing inks (the so-called pore printing ink) employed for the printing being varnish-repellent, and the printed substrate is then varnished, which process is characterized in that the printed substrate is varnished with a radiation-curable varnish and the varnish coat applied is cured with high-energy radiation, the radiation-curable varnish containing no amino resin and comprising A) from 18 to 99.9% by weight, preferably from 49.5 to 82.5% by weight, of an epoxy acrylate, a polyether acrylate or a polyester acrylate, or of a mixture of these acrylates, B) from 0.1 to 5.0% by weight, preferably from 0.5 to 1.5% by weight, of a Brönsted acid, an acid anhydride, a mixture of Brönsted acids, a mixture of acid anhydrides or a mixture of at least one Brönsted acid and at least one acid anhydride C) from 0 [sic] to 12% by weight, preferably from 3 to 6% by weight, of a photoinitiator, or of a mixture of photoinitiators D) from 0 to 40% by weight, preferably from 5 to 15% by weight of water or of at least one organic solvent or of a mixture of water and at least one organic solvent, preference being given to water or to a mixture of water and at least one organic solvent, E) from 0 [sic] to 10% by weight, preferably from 4 to 8% by weight, of a polyol which may be ethoxylated and/or propoxylated and has from 2 to 50, preferably from 4 to 20, carbon atoms in the molecule, or of a mixture of such polyols, and F) from 0 [sic] to 30% by weight, preferably from 5 to 20% by weight, of other auxiliaries and additives.

Using the process according to the invention it is possible to prepare articles, especially synthetic veneers, which have an excellent three-dimensional surface structure. This process is successful, surprisingly, even when the printed substrates are printed with pore printing inks which, when aqueous, heat-curable varnishes of the prior art are employed whose binders comprise hydroxyl-containing resins in combination with amino resins, lead to the formation of varnish coats having a three-dimensional surface structure. In other words, it is not necessary to employ special pore printing inks matched to the varnishes employed in accordance with the invention, a fact which leads to considerable economic advantages given the convention in practice of processing heat-curable and radiation-curable varnishes in parallel. It has been established that this surprising advantage is to be attributed, in particular, to the presence, in the varnishes employed in accordance with the invention, of component B, which is usually not present in radiation-curable varnishes.

In the course of the process according to the invention, no formaldehyde or methanol is liberated and it is possible to employ varnishing equipment which requires little space. The varnishes employed in the process according to the invention have a high solids content and can be stored as one-pack systems.

The invention also relates to the articles prepared by the process according to the invention and to radiation-curable varnishes which contain no amino resin and comprise A) from 18 to 99.9% by weight, preferably from 49.5 to 82.5% by weight, of an epoxy acrylate, a polyether acrylate or a polyester acrylate, or of a mixture of these acrylates, B) from 0.1 to 5.0% by weight, preferably from 0.5 to 1.5% by weight, of a Brönsted acid, an acid anhydride, a mixture of Brönsted acids, a mixture of acid anhydrides or a mixture of at least one Brönsted acid and at least one acid anhydride C) from 0 [sic] to 12% by weight, preferably from 3 to 6% by weight, of a photoinitiator, or of a mixture of photoinitiators D) from 0 to 40% by weight, preferably from 5 to 15% by weight of water or of at least one organic solvent or of a mixture of water and at least one organic solvent, preference being given to water or to a mixture of water and at least one organic solvent, E) from 0 [sic] to 10% by weight, preferably from 4 to 8% by weight, of a polyol which may be ethoxylated and/or propoxylated and has from 2 to 50, preferably from 4 to 20, carbon atoms in the molecule, or of a mixture of such polyols, and F) from 0 [sic] to 30% by weight, preferably from 5 to 20% by weight, of other auxiliaries and additives.

With the varnishes according to the invention, it is possible by the process described above, using space-saving varnishing equipment, to prepare articles with an excellent three-dimensional surface structure. With the varnishes according to the invention it is possible in particular to prepare synthetic veneers whose surfaces are barely distinguishable from natural wood surfaces. This process is successful, even when the printed substrates are printed with pore printing inks which, when aqueous, heat-curable varnishes of the prior art are employed whose binders comprise hydroxyl-containing resins in combination with amino resins, lead to the formation of varnish coats having a three-dimensional surface structure. In other words, it is not necessary to employ special pore printing inks matched to the varnishes employed in accordance with the invention, a fact which leads to considerable economic advantages given the convention in practice of processing heat-curable and radiation-curable varnishes in parallel. It has been established that this surprising advantage is to be attributed, in particular, to the presence, in the varnishes employed in accordance with the invention, of component B.

The varnishes according to the invention have a high solids content, do not give off formaldehyde and can be stored as single-component systems over long periods of time.

In a first step of the process according to the invention, a substrate is printed and at least one of the printing inks employed for the printing is varnish-repellent. This first working step of the process according to the invention is well known and is described in detail, for example, in DE-A-33 14 610, EP-A-43 062 and DE-A-32 47 677.

Substrates which can be employed are all printable substrates, for example wood, especially wooden panels, wood materials (eg. chipboard, hardboard and medium-density fiberboard), especially panels of wood materials and plastics, especially plastic sheets. The substrates preferably employed are paper sheets having a weight per square meter of from 30 to 250 grams. It is possible to employ as substrate both paper sheets which do not at that time carry any impregnation with a synthetic resin, and preimpregnated paper sheets.

The printed substrate is subsequently varnished, employing the radiation-curable varnishes described above which are composed of components A to F.

As component A an epoxy acrylate, a polyether acrylate, a polyester acrylate or a mixture of these acrylates is employed.

The term epoxy acrylates refers to reaction products of epoxide-containing compounds, for example epoxy resins based on bisphenol A, and acrylic acid and/or methacrylic acid. Epoxy acrylates are known and are commercially available in a wide selection. It is preferred to employ epoxy acrylates having a double-bond equivalent weight of from 1 to 4 mol/kg and a number-average molecular weight of from 400 to 1500. Examples of suitable epoxy acrylates are described in Richard Holman, UV and EB curing formulations for printing inks, coatings and paints, Sita Technology 203, Gardian House, Broonhill Road, London, SW 18, ISBN 0947798021.

The term polyether acrylates refers to reaction products of polyetherpolyols and acrylic acid and/or methacrylic acid. Polyether acrylates are known and are commercially available in a wide selection. It is preferred to employ polyether acrylates which have a double-bond equivalent weight of from 1 to 7 mol/kg and a number-average molecular weight of from 400 to 2000. Examples of suitable polyether acrylates are described in DE-A-33 16 593 and in DE-A-38 36 370.

The term polyester acrylates refers to reaction products of polyesterpolyols and acrylic acid and/or methacrylic acid. Polyester acrylates are known and are commercially available in a wide selection. It is preferred to employ polyester acrylates which have a double-bond equivalent weight of from 1 to 5 mol/kg and a number-average molecular weight of from 500 to 2000. Examples of suitable polyester acrylates are described in DE-A-33 16 593 and in DE-A-38 36 370.

As component A it is possible to employ an epoxy acrylate, a mixture of epoxy acrylates, a polyether acrylate, a mixture of polyether acrylates, a polyester acrylate, a mixture of polyester acrylates, or a mixture of these acrylates.

As component B in the varnishes employed in accordance with the invention, a Brönsted acid, an acid anhydride, a mixture of Brönsted acids, a mixture of acid anhydrides or a mixture of at least one Brönsted acid and at least one acid anhydride is employed. It is preferred to employ phosphoric acid, citric acid, paratoluenesulfonic acid, fumaric acid, maleic acid, maleic anhydride or a mixture of these acids and/or acid anhydrides.

As component C the varnishes employed in accordance with the invention may comprise a photoinitiator or a mixture of photoinitiators. Examples of photoinitiators which can be employed are benzophenone, benzophenone derivatives, benzoin, benzoin derivatives, especially benzoin ethers, benzil, benzil derivatives, acetophenone, acetophenone derivatives, thioxanthone, thioxanthone derivatives and antraquinone [sic] or antraquinone [sic] derivatives. These known photoinitiators can be combined, if desired, with synergistically acting compounds, for example trialkylamines, dialkylmonohydroxyalkylamines and monoalkyldihydroxyalkylamines. If the varnishes employed in accordance with the invention are to be cured with the aid of ionizing radiation, for example electron beams, then the addition of component C may be omitted.

As component D the varnishes employed in accordance with the invention may comprise water or at least one organic solvent or a mixture of water and at least one organic solvent. Examples of organic solvents which may be employed are butyl acetate, methoxypropanol, propylene glycol and butylene glycol. As component D the varnishes employed in accordance with the invention preferably comprise water or a mixture of water and at least one organic solvent.

As component E the varnishes employed in accordance with the invention may comprise polyols which may be ethoxylated and/or propoxylated and which have from 2 to 50, preferably from 4 to 20, carbon atoms in the molecule. Examples of such polyols are: ethylene glycol, ethoxylated and/or propoxylated ethylene glycol, propylene glycol, ethoxylated and/or propoxylated propylene glycol, butylene glycol, ethoxylated and/or propoxylated butylene glycol, glycerol, ethoxylated and/or propoxylated glycerol, dimethylolpropane, ethoxylated and/or propoxylated dimethylolpropane, pentaerythritol, ethoxylated and/or propoxylated pentaerythritol, neopentylglycol, ethoxylated and/or propoxylated neopentylglycol, trimethylolpropane, ethoxylated and/or propoxylated trimethylolpropane and 1,6-hexanediol, ethoxylated and/or propoxylated 1,6-hexanediol.

As component F the varnishes according to the invention may comprise further auxiliaries and additives, examples being fillers, for example silicic acid, silicates, barium sulfate, talc, kaolin and ground cork, conventional color-imparting substances or pigments, leveling auxiliaries, antifoaming agents, antisettling agents and thixotropic agents.

The printed-substrates can be varnished using known application methods, for example spraying, knife-coating, casting or rolling. The applied varnish films are cured by irradiation with high-energy radiation, for example by irradiation with electron beams or UV radiation. These methods of curing varnish films are known and are described, for example, in the Glasurit Handbuch Lacke und Farben (Handbook of Coatings and Inks), Curt R. Vincentz Verlag, Hannover, 1984 on pages 415 to 418.

In the examples below the invention is illustrated in more detail. All parts and percentages should be understood as being by weight unless expressly stated otherwise.

1. Preparation of Varnishes According to the Invention 1.1 Varnish I

Intimate mixing is used to prepare a UV-curable varnish from the following components:

30 parts of an epoxy acrylate (Laromere® LR 8765, manufacturer: BASF AG);
42 parts of a polyether acrylate (Halmanufact® 5236, manufacturer: Hüttenes Albertus Chem. Werke GmbH, Düsseldorf, Germany);
9 parts of polyol TP08 (ethoxylated trimethylolpropane, manufacturer: Perstorp AB);
5 parts of benzophenone;
1.1 parts of a commercial wetting aid;
1.4 parts of a commercial antifoaming agent;
0.6 part of polypropylene wax;
2.4 parts of a silicic acid-based rheological auxiliary, and
8.5 parts of a 12 percent by weight aqueous solution of citric acid.

1.2 Varnish II

Varnish II is prepared as for varnish I. However, instead of the 30 parts of epoxy acrylate and 42 parts of polyether acrylate, 72 parts of the epoxy acrylate used to prepare varnish I are employed.

1.3 Varnish III

Varnish II [sic] is prepared as for varnish I. However, instead of the 30 parts of epoxy acrylate and 42 parts of polyether acrylate, 72 parts of the polyether acrylate used to prepare varnish I are employed.

2. Preparation of Synthetic Veneers by the Process According to the Invention

The varnishes according to the invention are knife-coated onto commercial, preimpregnated paper sheets which have been provided with a wood-pattern print produced using varnish-repellent printing inks, in an amount of 10 g per m² of paper sheet, and are cured by UV radiation. The resulting synthetic veneers have surfaces which are barely distinguishable from the corresponding natural wood surfaces.

What is claimed is:

1. Radiation-curable varnishes, characterized in that they contain no amino resin and comprise A) from 18 to 99.9% by weight of an acrylate selected from the group consisting of epoxy acrylates, polyether acrylates, polyester acrylates, and mixtures thereof, B) from 0.1 to 5.0% by weight of a compound selected from the group consisting of Brönsted acids, acid anhydrides, and mixtures thereof, C) from 0 to 12% by weight of a photoinitiator, or of a mixture of photoinitiators D) from 0 to 40% by weight of a solvent selected from the group consisting of water, organic solvents and mixtures thereof, E) from 0 to 10% by weight of a polyol having from 2 to 50 carbon atoms in the molecule selected from the group consisting of ethoxylated and propoxylated polyols and mixtures thereof; and F) from 0 to 30% by weight of other auxiliaries and additives, wherein all percents by weight are based on the total weight of the varnish and the varnish is an intimately mixed single-component composition.

2. Radiation-curable varnishes according to claim 1, wherein component A) is selected from the group consisting of epoxy acrylates, polyether acrylates, and mixtures thereof.

3. Radiation-curable varnishes according to claim 1, wherein component B) is selected from the group consisting of phosphoric acid, citric acid, para-toluenesulfonic acid, maleic acid, maleic anhydride and mixtures thereof.

4. The radiation curable varnish of claim 1, wherein polyol E has from 4 to 20 carbon atoms in the molecule selected from the group consisting of ethoxylated and propoxylated polyols and mixtures thereof.

* * * * *